Jan. 13, 1948. M. STEINSCHLAEGER 2,434,444
PROCESS FOR THE PRODUCTION OF INDUSTRIAL OR POWER GASES
Filed Aug. 6, 1945
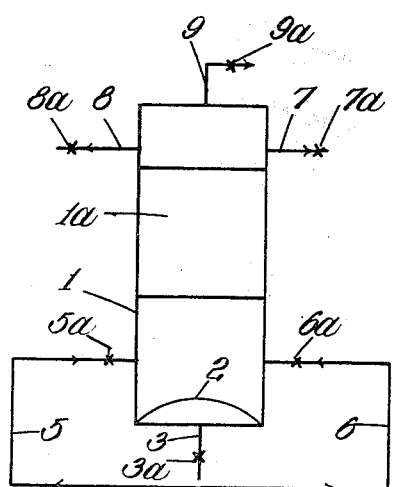
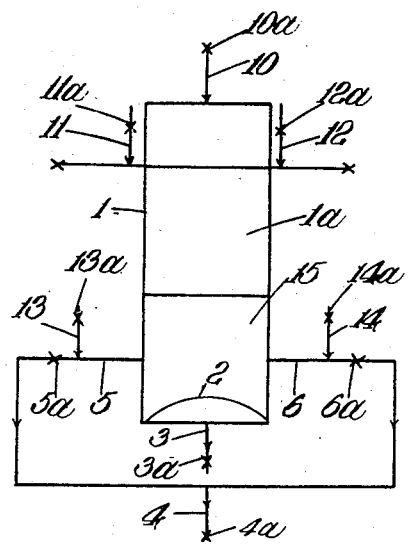
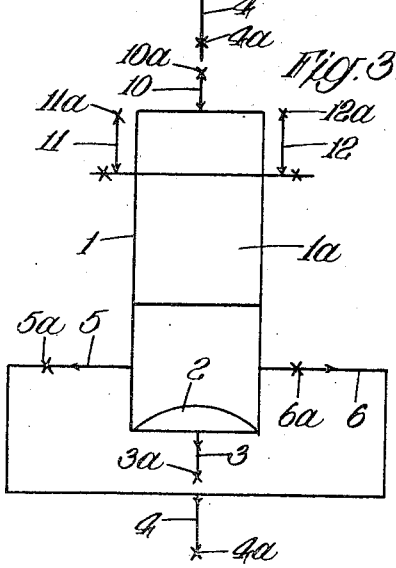
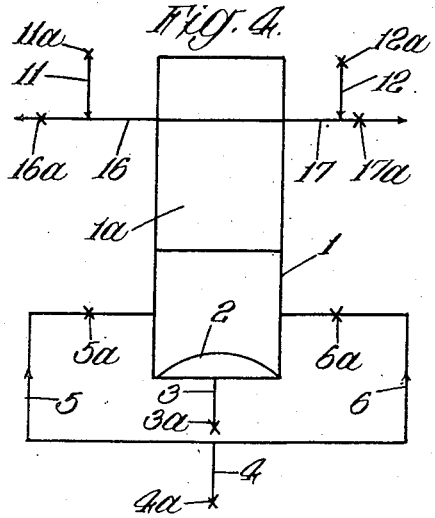
Inventor,
Michael Steinschlaeger
By
Young, Emery & Thompson
Attys.

Patented Jan. 13, 1948

2,434,444

UNITED STATES PATENT OFFICE 2,434,444

PROCESS FOR THE PRODUCTION OF INDUSTRIAL OR POWER GASES

Michael Steinschlaeger, London, England

Application August 6, 1945, Serial No. 609,234
In Great Britain September 24, 1942

2 Claims. (Cl. 48—205)

1

This invention relates to a process for the production of industrial or power gases and is a continuation-in-part of my application Serial No. 494,730, now abandoned.

In producing carburetted water gas or like carburetted gases such as oil gases, it is of great importance to be in a position to vary considerably the proportion of consumption of solid fuels to oil and the capacity of an existing plant at short notice to meet the changeable requirements.

The object of the present invention is to provide a simple and efficient process, which has the above mentioned characteristics, flexibility and advantages coupled with a considerable decrease in solid and fluid fuel consumption.

Accordingly the present invention provides a process for the manufacture of industrial and power gases such as carburetted water gas and oil gases in which a bed of solid fuel or a mixture of solid fuel with tar or oil in a generator is reacted with a gas or gases which comprises mixing hot gases leaving the generator with an oil tar or the like, the said hot gases being removed from the generator at at least one point between the edge of the reaction zone and an end of the generator at which they are still at a temperature sufficiently high and possessing sufficient sensible heat to crack the oil, tar or the like, the amount of the sensible heat of the gases being controlled by a choice of their paths through the generator. The hot gases leaving the generator may be further heated or mixed with other hot gases before being mixed with the oil, tar or the like.

According to one embodiment of the invention the bed or fuel in the generator is subjected to alternate blowing and gas making periods and the process comprises mixing the hot gases leaving the generator in a gas making period with an oil tar or the like, the said hot gases being removed from the generator at at least one point between the edge of the reaction zone and an end of the generator at which they are still at a temperature sufficiently high and possessing sufficient sensible heat to crack the oil, tar or the like, the amount of the sensible heat of the gases being controlled by a choice of their paths through the generator. The hot gases leaving the generator may be further heated or mixed with other hot gases before being mixed with the oil, tar or the like.

Further tar, oil or the like may be mixed with the industrial and power gases obtained by the process of the present invention and the mixture then further heated to crack the oil, tar or the

2 like. This treatment may be repeated if desired.

In the manufacture of carburetted water gas according to the invention part of the gases leaving the generator in a gas making period together with steam may be re-cycled through the generator in order to provide part of the heat necessary to compensate for heat losses and part of the heat necessary for the reaction.

In the application of the invention to the manufacture of gases used for power generation a carburetted water gas produced by the process of the invention may be used to drive an engine and the sensible heat of exhaust gases from said engine with or without admixture with other gases may be used to evaporate and crack oil, tar or the like mixed with said exhaust gas for the carburettion thereof.

A carburetted water gas plant comprising a generator, a carburettor and a superheater may be used to carry out the process of the invention or an ordinary water gas plant comprising a generator and a regenerator can be used.

The following is a more detailed description of an embodiment of the invention in which steam is used.

1. *Gas making period.*—Preferably preheated steam or preheated gases alone or a mixture of both is used. If the gases and steam leaving the generator do not possess sufficient heat for the evaporation and the cracking, preheated steam alone and/or other preheated gases are added to the gas and undecomposed steam leaving the generator. The preheated steam and/or the gases are preferably used in an injector to bring the cold or hot oils, tars, pitches, distillation gases, etc., used for carburetting, into the gases. If more steam and/or gases are used so that the sensible heat of them is sufficient to evaporate the oil the steam and/or the gases are brought into the oils, tars, etc. and the outgoing steam and/or gases are saturated with oils vapours or cracked gases necessary for carburetting or increasing the calorific value.

The temperature of the steam and/or gases and the ratio of oil to steam and/or gases can be also so chosen that evaporation and cracking of the oil takes place before the mixture of cracked gas with steam and/or other gases (before or after cooling or using the sensible heat in other ways) is added to the gases produced to increase the calorific value of the latter. All these modifications of oil addition or carburetting can be used together and oils with different characteristics can be used at the same time using the most advantageous conditions for treating each oil.

The sensible heat of the carburetted water or like gas is used (as in this form of making carburetted water or like gas no vessels need to be used as carburettors or superheaters) to heat one of the two vessels of which one is used in the blow period for preheating the air necessary for blowing or heating purposes. A part or the whole of the sensible heat of the carburetted water gas can be used for steam generating.

If a higher preheating temperature of the preheated air is preferable a part of the sensible heat of the gases and undecomposed steam leaving the generator is not used for carburetting but is used direct for the heating of the vessel. To this gas and undecomposed steam more preheated steam and/or gases can be added or only preheated steam alone or by using more units blow gases or combustion gases are used for heating the vessel. In the case of using steam alone the cooled steam leaving the vessel can be used for heating the water necessary for steam generating. If the steam used in the plant has originally a higher pressure which must be reduced before using the steam in the generator plant, instead of reducing the pressure of the steam the energy in this steam is used in an injector to re-cycle the steam leaving the vessel. Another possibility is to use a part of the time required for gas making for carburetting and in the other part of the period to use the gases leaving the generator for heating the vessel. If a plant is used which consists of several units other suitable arrangements for preheating steam, air etc., for heating the vessels and for carburetting can be made and the number of vessels can be decreased.

If the gas production is accomplished under pressure the temperature and the pressure of the steam leaving the vessel can be so adjusted as to use the steam for electric current or power generating. The carburetted water gas and undecomposed steam which are in this case under pressure can be also used alone or after admixture of steam and if desired regulating the temperature and if necessary after removal of dust for electric current or power generating. The preheating of the steam is accomplished in the other vessel.

2. *Blowing period.*—Preferably preheated air is brought into the generator. The blow gases or a part of the blow gases leaving the generator are used for heating the vessel which is necessary for preheating the steam. The sensible heat of the blow gases alone or in admixture with preheated steam and/or gases can be used for carburetting by injecting oil or a mixture of oil and steam and/or gases or preheated steam and/or gases into the blow gases. The gas thus obtained can be used separately or in admixture with the gas made in the gas making period. The blow gases without being used for carburetting and/or combustion products can be used in admixture with the carburetted gases made. The sensible heat of the combustion products can also be used for carburetting purposes. The gases and undecomposed steam leaving the generator may be still further preheated or superheated in a regenerator before the oil, tar or the like is injected into them for evaporation and cracking.

If coke or coal of smaller size should be used for gas production and the plant consist of several units, some of the units can be used for generating producer gas for admixture with the carburetted water gas. The sensible heat of the producer gas alone or in admixture with preheated steam and/or gases can also be used for carburetting purposes. By this method a considerable increase in capacity can be achieved and fuels of low calorific and market value used.

As solid fuels different kinds of coke, coal, briquettes, etc. can be used.

As fluid fuels hot or cold oils, tars, pitches, distillation gases, etc. can be used with better results than in well known processes because the treatment of the oil or gas is not so severe as in the known processes.

The process can be applied to generator constructions in which the ash leaves the generator in solid or fluid condition or with mechanically operated grates.

The preheated steam and air are introduced according to their temperature and the construction of the generator at such places as to achieve the most advantageous conditions and results. For instance when using a generator having a mechanically operated grate they are introduced above the grate or if the temperatures of the air and steam are different at different distances from the bottom or top of the generator.

When using coal this is preferably only partly preheated in the blow period (up to a temperature at which carbonisation just begins) so as to obtain oil or a greater part of the carbonisation gases and the tar or cracked tar in the gases leaving the generator in the gas making period. Thereby the calorific value of these gases is increased and less oil is used for carburetting or by using the same proportion of oil a higher calorific value of the gas produced is obtained.

When using coke for generating gas the preheating of the coke is preferably divided between the blow and gas making periods or the blow gases and the gases produced are taken out at different points of the generator, so as to achieve the most advantageous temperatures and conditions for carburetting the oil, fuel consumption and increase in capacity.

The process is very flexible concerning the alteration of the output of the same plant, the possibilities of the alteration of the calorific value of the gas produced, and the variation of the ratio between the ratio of liquid to the solid fuels used; gases with different calorific values can be produced and different oils (cracked at different temperatures) can be advantageously used at the same time.

A preferred process according to the invention will now be described in detail with the aid of the accompanying drawings, in which:

Fig. 1 shows an up blowing period,
Fig. 2 shows a down gas making period,
Fig. 3 shows a down blowing period, and
Fig. 4 shows an up gas making period.

Referring to Fig. 1 of the drawings, the generator 1 contains a solid fuel such as coke or a mixture of solid fuel and oil or tar and air which is preferably preheated is admitted below the grate 2 through a conduit 3 controlled by valve 3a and also above the grate through the conduits 4, 5 and 6 controlled respectively by valves 4a, 5a and 6a thereby heating the reaction zone 1a in which a part of the fuel (including the oil or tar if used) is burnt. A part of the blow gases is removed a short distance above the reaction zone through the conduits 7 and 8 controlled respectively by valves 7a and 8a and the remainder through the conduit 9 controlled by valve 9a at the top of the generator 1. The blow gases leaving the generator may be used to heat one or more regenerators (not shown).

Referring to Fig. 2 of the drawings, steam (which is preferably superheated) is admitted through the conduit 10 controlled by valve 10a at the top of the generator and also through conduits 11 and 12, controlled respectively by valves 11a and 12a to the top of the reaction zone which is maintained at an average temperature of 1100° C. Part of the mixture of water gas produced and excess steam leaves the generator through conduits 5 and 6 at a temperature of 950° C. and oil for carburetting is admitted through conduits 13 and 14 controlled respectively by valves 13a and 14a the oil being evaporated and cracked and the carburetted water gas leaves through conduit 4 at a temperature of 750° C. The remainder of the water gas produced and excess steam leaves the generator through conduit 3, part of the heat being stored in the ash 15.

Referring to Fig. 3 of the drawings, air (preferably preheated) is admitted through conduits 10, 11 and 12 and the blow gases leave through conduits 3, 4, 5 and 6 and may be used to heat one or more regenerators (not shown).

Referring to Fig. 4 of the drawings, steam is admitted below the grate through conduit 3 and also above the grate through conduits 4, 5 and 6. The mixture of water gas produced and excess steam leaves the generator at a temperature of 1100° C. at the top of the reaction zone through conduits 16 and 17 controlled by valves 16a and 17a respectively, oil for carburetting being admitted through conduits 11 and 12. The carburetted water gas produced has a temperature of 750° C.

The advantages of the present invention are shown by the following, which is:

I. *A calculation of the oil cracked and the calorific value of the carburetted water gas obtained according to applicant's process*

1. Average temperature of the reaction zone _____° C__ 1200
2. Average temperature of the gases leaving the reaction zone and removed from the generator, in this case at the edge of the reaction zone _____° C__ 1200
3. Temperature at which the cracking is accomplished__° C__ 730
4. Undecomposed steam per cubic meter of water gas produced _____kgm__ 0.2
5. The sensible heat available in 1 cubic meter of water gas and 0.2 kgm. of steam between the temperatures of 1200° and 703° C. for the cracking of oil:

$(1 \times 1200 \times 0.334 + 0.2 \cdot 1200 \cdot 0.525) -$
    $(1 \cdot 730 \times 0.321 + 0.2 \cdot 730 \times 0.435) = (400 + 126) - (234 + 71) =$
    $526 - 305 = 221$ cals. per cubic meter of water gas removed from the generator (in this case at the edge of the reaction zone).

6. Heat required to crack 1 kgm. of oil (oil before being mixed with the gas being at 60° C.) mean specific heat of the oil is 0.6 cal. per kgm.:

$(730 - 60) \, 0.6 = 401$ cals. per kgm. of oil.

7. Taking into account the reaction heat which differs according to the conditions of cracking and the composition and properties of the oil used and gases obtained. Taking for this case 100 cals. per kgm. of oil, the total heat required to crack 1 kgm. of oil is:

$401 + 100 = 501$ cals. per kgm.

8. The amount of oil which can be cracked per cubic meter of water gas removed from the generator at 1200° C.:

$221 \div 501 = 0.440$ kgms. (or 0.220 cubic meter of gas from the oil.)

9. Taking the calorific value of the oil to be 10,000 cals. per kgm. and a cracking efficiency of 85%; the potential heat in the gas obtained will be:

$0.440 \cdot 10,000 \cdot 0.83 = 3730$ cals. per cubic meter of water gas removed.

10. The calorific value of the gas obtained per cubic meter of water gas may be calculated as follows:

| | Cals. |
    |---|---|
    | 1.0 cubic meter of gas of calorific value | 2650 |
    | 0.220 cubic meter of gas from oil | 3730 |

1.220 cubic meter of gas obtained per cubic meter of
    1.220 cubic meter of gas obtained per cubic meter of water gas _____ 6380 or the calorific value of the gas generated is:

$\frac{6380}{1.22} = 5230$ cals. per cubic meter or 587 B. t. u. per cubic foot.

II. *Calculation of the oil cracked and the amount of gases obtained per cubic meter of water gas removed using the blow gases for heating steam and using the sensible heat of the steam for oil cracking*

1. Amount of blow gases per cubic meter of water gas removed _____ cubic meter__ 1.8
2. Composition and temperature of the blow gases leaving the generator in the blow cycle:

$CO_2 = 15\%$; $CO = 9.5\%$

Temperature of the blow gases leaving the generator____° C__ 700

3. Potential heat in the blow gases:

$1.8 \cdot 0.095 \cdot 3030 = 517$ cals. per cubic meter

Sensible heat in the blow gases:

$1.8 \cdot 700 \cdot 0.332 = 418$ cals. per cubic meter

Total heat in the blow gases per cubic meter of water gas removed:

$517 + 418 = 935$ cals.

4. Assuming that 65% of the 935 cals. is transferred to the steam the sensible heat of which will be used for cracking the oil. The amount available for cracking oil will be:

$935 \cdot 0.65 = 610$ cals. per cubic meter of water gas removed.

5. The heat required to heat steam from 120° C. to 1200° C. in the regenerator:

$1200 \cdot 0.525 - 120 \cdot 0.446 = 630 - 54 = 576$ cals. per kgm. of steam.

6. Sensible heat available per kgm. of steam between 1200° C. and 730° C. (cracking temperature):

$1200 \cdot 0.525 - 730 \cdot 0.485 = 630 - 354 = 276$ cals. per kgm. or per cubic meter of water gas removed:

$276 \cdot 1.06 = 293$ cals.

7. Oil which can be cracked per cubic meter of water gas removed:

$\frac{293}{501} = 0.583$ kgms.

8. Potential heat in the gas obtained from oil at 85% efficiency of the cracking based on 1 cubic meter of water gas removed at 1200° C. from the generator:

$0.583 \cdot 0.85 \cdot 10,000 = 4950$ cals. (or 0.291 cubic meter of gas obtained per cubic meter of water gas removed).

The calorific value of the gas obtained from oil after condensing the steam, 17,000 cals. per cubic meter or 1910 B. t. u. per cubic foot.

It should be understood that the term "tar, oil or the like" as used herein includes hydrocarbon gases and when these are used no evaporation will be necessary prior to the cracking.

The term "oil" as used in the appended claims includes tars and similar substances including hydrocarbon gases.

I claim:

1. In a process for the production of industrial and power gases in which a bed of solid fuel or a mixture of solid fuel with oil in a generator is subjected to alternate blowing periods in which the fuel is reacted with a gas containing free oxygen and gas making periods in which the fuel is reacted with steam, the step of mixing hot gases leaving the said generator in a gas making period with an oil, the said hot gases being removed from the generator at at least one point between a boundary of the reaction zone and a boundary of the fuel bed at which they are still at a temperature sufficiently high and possessing sufficient sensible heat to crack the oil, the cracking of the oil being performed solely by said gases and the amount of the sensible heat of the gases being controlled by a choice of their point of exit between a boundary of the fuel bed and a boundary of the reaction zone.

2. In a process for the production of industrial and power gases in which a bed of solid fuel or a mixture of solid fuel with oil in a generator provided with a grate is subjected to alternate blowing periods in which the fuel is reacted with a gas containing free oxygen and gas making periods in which the fuel is reacted with steam, the step of mixing hot gases leaving the said generator in a down gas making period with an oil, the said hot gases being removed from the generator at at least one point between the lower boundary of the reaction zone and the grate at which they are still at a temperature sufficiently high and possessing sufficient sensible heat to crack the oil, the cracking of the oil being performed solely by said gases and the amount of the sensible heat of the gases being controlled by a choice of their point of exit between the lower boundary of the reaction zone and the grate.

MICHAEL STEINSCHLAEGER.

REFERENCES CITED

The following references are of record in the file of this patent:

UNITED STATES PATENTS

| Number | Name | Date |
|---|---|---|
| 291,421 | Stewart | Jan. 1, 1884 |
| 598,921 | Glasgow | Feb. 15, 1898 |
| 1,821,333 | Tolman | Sept. 1, 1931 |
| 1,955,774 | Sachs | Apr. 24, 1934 |
| 1,547,191 | Abbott | July 28, 1925 |
| 1,822,547 | Stelfox | Sept. 8, 1931 |

FOREIGN PATENTS

| Number | Country | Date |
|---|---|---|
| 328,642 | Great Britain | Apr. 25, 1930 |

OTHER REFERENCES

Haslan and Russell, "Fuels and Their Combustion," page 611.